Nov. 3, 1936.  C. G. TRIMBACH  2,059,717

FLEXIBLE ADAPTER FOR MACHINE GUNS

Filed Aug. 7, 1933  2 Sheets-Sheet 1

INVENTOR.
CLEM G. TRIMBACH.
BY
ATTORNEYS.

Nov. 3, 1936.  C. G. TRIMBACH  2,059,717
FLEXIBLE ADAPTER FOR MACHINE GUNS
Filed Aug. 7, 1933  2 Sheets-Sheet 2
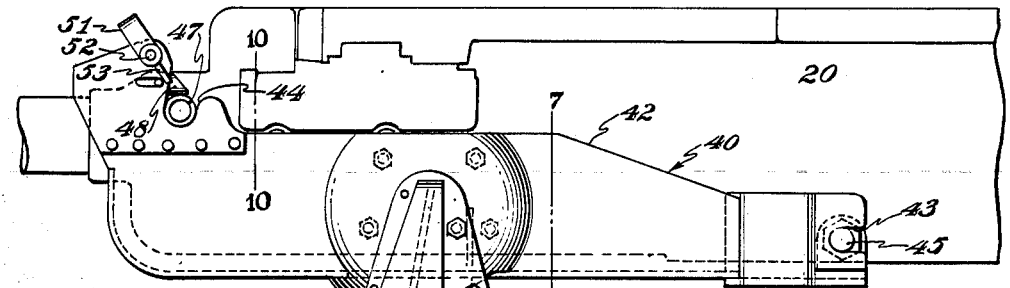
FIG. 6.
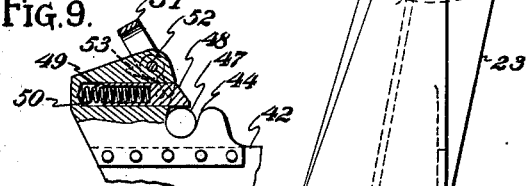
FIG. 9.
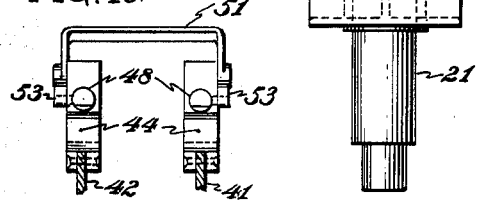
FIG. 10.
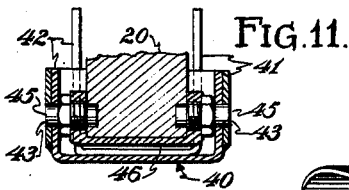
FIG. 11.
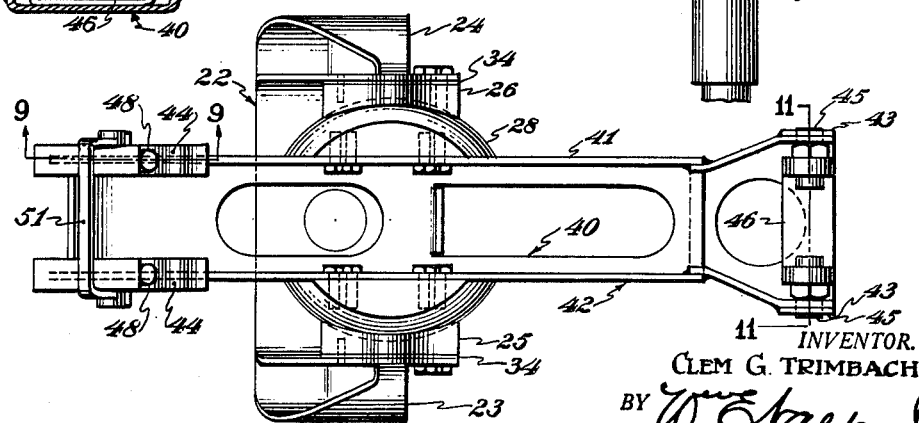
FIG. 7.
FIG. 8.
INVENTOR.
CLEM G. TRIMBACH.
BY
ATTORNEYS.

Patented Nov. 3, 1936

2,059,717

UNITED STATES PATENT OFFICE 2,059,717

FLEXIBLE ADAPTER FOR MACHINE GUNS

Clem G. Trimbach, Kenmore, N. Y., assignor to Curtiss Aeroplane & Motor Company, Inc., a corporation of New York Application August 7, 1933, Serial No. 683,958

3 Claims. (Cl. 89—37)

This invention relates to aircraft armament, and is more particularly concerned with improvements in flexible gun mounts for aircraft machine guns.

Aircraft machine guns are ordinarily either fixed to be aimed with the airplane or are mounted flexibly so that a gunner may aim the gun in any one of numerous directions. This invention, concerned with the latter type of gun mount, provides a greater latitude of movement of the machine gun with respect to the airplane, and enables the gunner to properly aim the gun in any sector of fire to which the gun mount is capable of movement. A typical gun mount construction includes a carriage movable with respect to a track or the like carried in an aircraft cockpit, the gun being carried in an adapter movable with respect to the mount. The mount is capable of adjustment with respect to the aircraft to cover certain sectors of fire, such as lateral, rearward or upward. The gun on its adapter, is movable with respect to the mount in order that the gunner may aim the gun to follow a moving target in any one said sector of fire. Past adapters for such machine guns have had limitations in their universality of movement, due to the location and mounting of the trunnions on which the gun is carried. It is an object of this invention to provide a wholly universal gun adapter whereby the gun may be elevated, traversed or tilted with respect to the gun mount. This objective allows the gunner to properly aim the gun downwardly over the side of the fuselage and enables him to follow a moving target in such position. Likewise, he may properly follow a target when the gun is in angles of high elevation, either laterally or rearwardly.

A further object is to provide a spherical joint for attaching the gun to an adapter whereby the gun attains universality of movement.

A still further object is to provide a common center of movement for the gun with respect to its adapter, such center being located close to the center of gravity of the gun. Thus, the gun may be balanced in any position of aiming so that a minimum of effort is required on the part of the gunner either to hold the gun in an aimed position or to move it to a new aiming point.

A further object is to provide suitable and practical mechanism of light weight and simple construction for the attainment of the above named objects.

Still a further object is to provide a gun adapter to which the gun may be readily attached and from which it may be detached, without the aid of tools, thus allowing for quick and easy removal of the gun for service work thereon, and allowing for the installation of a newly serviced gun with a minimum of time and trouble.

A still further object is to provide a frictional connection between the gun adapter and the gun which may be so adjusted as to require a greater or less amount of effort to move the gun from one aiming point to another.

Generally, my invention comprises a yoke arranged to be carried by a movable gun mount. A pair of frictional blocks having concave spherical surfaces are fixed to the yoke to engage a spherical member carried by the machine gun. This spherical member is of adequate size so that the gun is mounted in a slot formed therein, and by the shape of the slot and the size of the sphere, the center of the sphere is substantially coincident with the center of gravity of the gun. An alternative embodiment of the invention provides a cradle carried by the sphere and in which cradle the gun may be detachably secured.

For a clearer understanding of the invention, reference may be made to the appended drawings, in which similar numbers indicate similar parts, and in which:

Fig. 6 is a side elevation of an alternative embodiment of a gun adapter, showing a machine gun mounted thereon;

Fig. 7 is a section on the line 7—7 of Fig. 6;

Fig. 8 is a plan of the alternative embodiment of the gun adapter;

Fig. 9 is a section on the line 9—9 of Fig. 8;

Fig. 10 is a section on the line 10—10 of Fig. 6, with the gun unmounted;

Fig. 11 is a section on the line 11—11 of Fig. 8 showing a portion of the gun in position.

Figure 1:
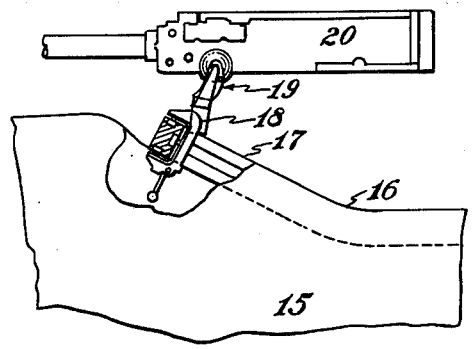
Fig. 1 is a side elevation, partly in section, of a portion of an aircraft including a gun mount, a machine gun, and the adapter of this invention.
Figure 2:
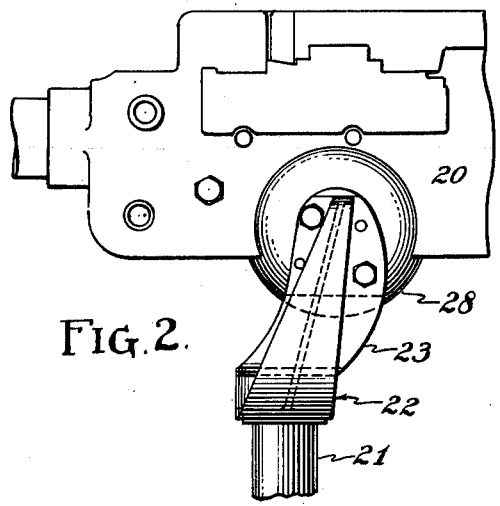
Fig. 2 is a side elevation of a rearward portion of a machine gun mounted in the adapter.
Figure 3:
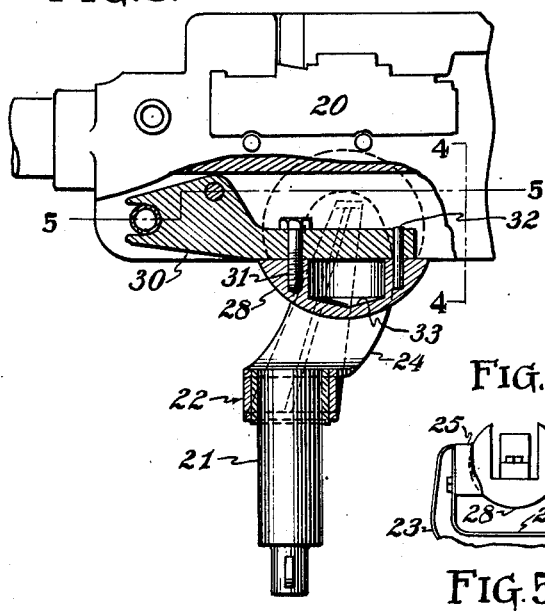
Fig. 3 is a view similar to Fig. 2, partly in section, to show the construction of the adapter.
Figure 4:
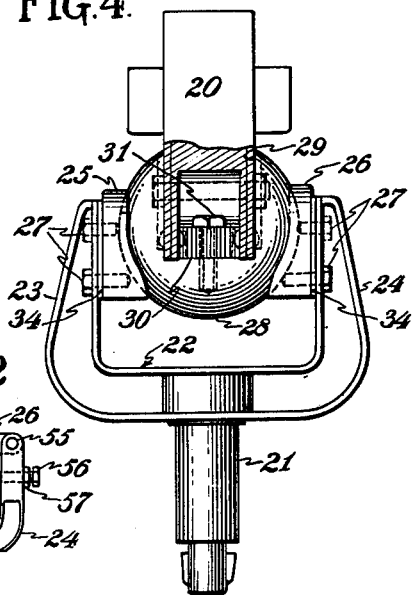
Fig. 4 is a section on the line 4—4 of Fig. 3.
Figure 5:
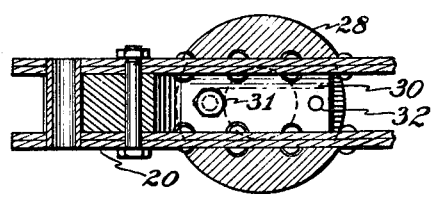
Fig. 5 is a section on the line 5—5 of Fig. 3.

Referring briefly to Fig. 1, a portion of an airplane fuselage 15, having a cockpit 16, is provided with a curved rail 17 forming an edge for said cockpit. A carriage 18 is arranged to move on the rail 17, said carriage carrying a gun adapter 19 which in turn carries a gun 20 for universal movement with respect to the adapter. The elements 15, 16, 17, 18, and 20, broadly show a conventional gun mount construction, the details of which are not a part of the invention. The adapter 19 specifically is the essence of the invention and will now be more fully described. Referring to Figs. 2 to 5, inclusive, one embodiment of the adapter 19 is shown. The adapter comprises a spindle 21 arranged to engage within a suitable socket formed in the carriage 18, and at the top of said spindle a yoke 22, having upstanding spaced arms 23 and 24, is carried. The arms 23 and 24 carry at their upper inner ends, respectively, a pair of blocks 25 and 26, these blocks being attached to the arms by suitable bolts 27. The blocks 25 and 26, at their inner faces, are concavely formed as sectors of a sphere. Between the two blocks 25 and 26, and engaging with said spherical surfaces, is a spherical member 28, its surface being complementary to the spherical surfaces of the blocks 25 and 26. Said member 28 has formed therein a substantially rectangular slot 29 of such a size that the machine gun 20 may fit therein. As shown in Figs. 3, 4, and 5, a portion 30 of the machine gun 20 is arranged to be bolted, as by a bolt 31 and a dowel pin 32, to the member 28, thus holding the gun rigidly to said member. A drilling 33 may be made in the lower solid portion of the member 28 to reduce the weight thereof, such weight reduction being, of course, eminently desirable in any mechanism pertaining to aircraft. In order that the frictional engagement between the blocks 25 and 26 and the spherical member 28 may be altered to provide for satisfactory universal action of the gun 20 with respect to the adapter 19, shims 34 of suitable thickness may be inserted between the block 25 and the arm 23, and between the block 26 and the arm 24.

It will now be apparent that the gun 20 may be moved universally in limited angles with respect to the adapter 19, and that the gun may be elevated, may be traversed, or may be tilted with respect to said adapter.

Particular advantages from this universality of movement accrue when the gun is elevated to high angles of fire. In such an attitude, in previous mounts and adapters, it has been impossible to traverse the gun due to the location of the pivot axes on which the gun was mounted. Hence, in order to traverse the gun with high angles of fire, it was necessary to move the whole carriage 18 with respect to the track 17, which motion was slow and difficult, hampering the speed and accuracy of gun fire. By the ball joint above described, the gunner may traverse the gun regardless of the angle of elevation thereof, and also may tilt the gun to permit his sighting with greater ease. For instance, if the gun carriage 18 is along the side of the fuselage, and the gunner is attempting to shoot downwardly and rearwardly, he may tilt the gun about the gun axis to allow him to sight in a relatively upright position. In previous constructions, the gun when being aimed as above described, would be on its side, and hence it would be necessary for the gunner to reach far out over the side of the fuselage in order to sight along the top of the barrel, the sights, in the gun attitude described, extending laterally from the fuselage. It will be readily appreciated that other gun aiming positions will be greatly facilitated by the ability of the gunner to tilt the gun on its mount. For instance, Fig. 1 shows an inclined section of track on which the gun carriage may be moved. If the gunner is aiming laterally from the side of the ship, the gun would normally be in a tilted position. In this invention, the gun may be tilted with respect to the adapter to assume a vertically upright position whereby more accurate fire by the gunner may be accomplished.

Figs. 6 to 11, inclusive, show an alternative form of the gun adapter, wherein the yoke 22, the blocks 25 and 26 and the spherical member 28 are substantially the same as in the first embodiment. However, instead of the member 28 directly holding the gun, said member has attached thereto a cradle 40 fastened to and extending forwardly and rearwardly from the spherical member 28. Said cradle is provided with side member 41 and 42 spaced from each other a distance somewhat greater than the width of the gun. The rearward ends of the members 41 and 42 are provided with open-ended slots 45, while the forward ends of the members 41 and 42 are provided with open-ended slots 44. Studs 45 fixed to the gun as by a fitting 46 are adapted to engage within the slots 43, while studs 47, affixed to a forward portion of the gun, are adapted to engage within the slots 44. A latch 48, best shown in Fig. 9, is arranged to slide within a recess 49 formed in the member 42, the latch 48 being outwardly impelled by a spring 50 within said recess. A similar latch 48 is also embodied in the member 41. It will thus be apparent that the gun may be readily engaged in the cradle 40 by first inserting the studs 43 in the slots 45 and then dropping the studs 47 into the slots 44. Upon the latter action, the latches 48 are pushed into their recesses and upon full engagement of the studs 47 in the slots 44, the latches 48 spring out to prevent disengagement of said studs. An operating handle 51 is pivoted to the members 41 and 42 as at 52, said handle carrying pins 53 adapted to engage with a portion of each latch. Thus, by moving the handle 51 rearwardly, the latches 48 are urged inwardly within the recesses 49 and the gun may be removed.

The flexibility in operation of the adapter embodiment of Figs. 6 to 11, inclusive, is identical with that described in connection with the first embodiment.

Figure 12:
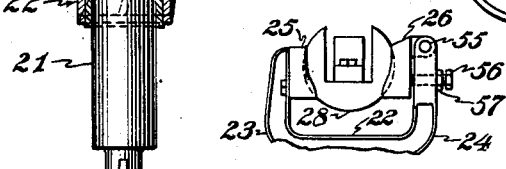
Fig. 12 is a rear elevation of the gun adapter showing an alternative method for adjusting the frictional contact between elements of the adapter.

Fig. 12 shows an optional arrangement by which the degree of friction, or the amount of pressure, of the blocks 25 and 26 against the spherical member 28, may be more readily altered. The block 25 is attached, as previously described, to the arm 23, but the block 26 is pivoted as at 55 to the arm 24. A screw 56 is threaded through the arm 24 and is adapted to bear upon the block 26 at a point remote from the pivot 55. A lock nut 57 is also threaded on the screw 56, whereby, after a proper adjustment has been attained, it may be held by said lock nut. Obviously, screwing in of the screw 56 will increase the pressure of the blocks 25 and 26 against the spherical member 28, tending to hold the gun in a firmer relation with the gun adapter. Conversely, by unscrewing the screw 56, the gun may be more freely moved with respect to the adapter. The desideratum is to have the gun fairly free to move with respect to the adapter, but to have the connections tight enough so that the gun may remain in any position in which it may be set by manual effort on the part of the gunner. Obviously, as wear in the mechanism takes place, it would tend to loosen up, and such wear may be compensated by adjustment of the screw 56. In the first described embodiments, such wear would be compensated by increasing the thickness of the shims 34.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. The combination with a machine gun of a sphere having a diameter greater than the width of said gun, said sphere having a slot within which said gun may lie to bring the center of gravity thereof and the center of said sphere into substantial coincidence, a pair of segmental blocks frictionally engaging the outer surface of said sphere, and a yoke carrying said blocks at the opposite ends of a diameter of said sphere.

2. In a flexible gun mount, in combination, a machine gun having a breech housing of substantially rectangular section wherein the height is greater than the width, a spherical element of a diameter greater than the breech width having a slot formed therein, said breech resting within said slot with the top breech portion extending beyond the sphere envelope, means for attaching said breech to said sphere, and segmental friction blocks carried by said mount engaging said sphere surface.

3. The combination with a machine gun of a spherical member struck on a diameter of greater extent than the width of the gun, said member being attached to the gun and substantially coincidental with the gun center of gravity, a pair of segmental blocks frictionally engaging the outer surface of said spherical member, and a yoke carrying said blocks at the opposite ends of a diameter of said spherical member.

CLEM G. TRIMBACH.